United States Patent [19]

Steingass

[11] Patent Number: 4,589,439
[45] Date of Patent: May 20, 1986

[54] FIRE APPARATUS VALVE

[75] Inventor: Robert W. Steingass, Valparaiso, Ind.

[73] Assignee: Task Force Tips Incorporated, Valparaiso, Ind.

[21] Appl. No.: 644,260

[22] Filed: Aug. 27, 1984

[51] Int. Cl.[4] ............ F16K 3/26; F16K 31/52
[52] U.S. Cl. ............... 137/219; 239/583; 251/121; 251/260; 251/282; 251/297; 137/333
[58] Field of Search ............ 137/219, 331, 333; 251/258, 260, 121, 282, 297; 239/456, 460, 583

[56] References Cited

U.S. PATENT DOCUMENTS

| | | | |
|---|---|---|---|
| 359,131 | 3/1887 | Clark | 251/297 |
| 1,496,338 | 6/1924 | Haley | 137/219 X |
| 2,503,618 | 4/1950 | Holm | 251/297 X |
| 2,704,547 | 3/1955 | Fox | 137/219 |
| 2,806,741 | 9/1957 | Fishelson et al. | 239/456 |
| 2,918,249 | 12/1959 | Page et al. | 251/282 X |
| 3,654,950 | 4/1972 | Hamm | 137/219 |
| 3,774,632 | 11/1973 | Mrugala | 137/333 X |
| 3,827,671 | 8/1974 | Bolden et al. | 251/297 X |
| 3,881,517 | 5/1975 | Lloyd et al. | 251/297 X |
| 4,117,859 | 10/1978 | Illy | 137/219 |
| 4,252,278 | 2/1981 | McMillan . | |
| 4,470,549 | 9/1984 | McMillan et al. . | |

Primary Examiner—Gerald A. Michalsky
Attorney, Agent, or Firm—Marshall, O'Toole, Gerstein, Murray & Bicknell

[57] ABSTRACT

A flow-control valve assembly particularly useful in fire fighting apparatus comprising a contoured valve seat mounted axially within a valve body and a balanced tubular valve member reciprocably movable in the valve body coaxially with said valve seat for providing proportional flow control, manual valve actuating means for reciprocably moving the tubular valve member including a disc rotatably mounted in a bore formed in a lateral surface of the valve body on a pivot member on which a handle is pivotally mounted and a pin spaced from the pivotal member extending through the handle and the disc which engages in a circumferential groove formed in the outer surface of the tubular valve member for effecting reciprocable movement of the valve member when the handle is reciprocably moved. The disc can be made of deformable material and provided with means for expanding the disc to impart a braking action on the movement of the handle. Also, the handle can be provided with detent means for conveniently positioning the valve member in a pre-selected position.

11 Claims, 7 Drawing Figures

FIRE APPARATUS VALVE

The invention relates generally to a valve assembly and valve operating mechanisms and more particularly to a flow-control valve assembly providing concentric annular flow, such as used in fire fighting apparatus including fire hose nozzles, fire pump trucks, and fire sprinkler systems.

THE PRIOR ART

The valve assembly of this invention is an improvement over the valve structures disclosure in the McMillan U.S. Pat. No. 4,252,278 and the McMillan et al U.S. patent application Ser. No. 390,749, filed June 21, 1982. In these prior art valve structures there is a non-linear relationship between the rate of flow of liquid through the valve and the movement of the valve actuating means. For example, when the valves of the prior art are in a half-open position the flow through the valve is about 80% of capacity so that movement of the valve handle from a half-open to a fully open position has relatively little effect on increasing rate of flow through the valve. Thus, the non-linear relationship prevents the desired fine control of flow through the valve, particularly in a fire hose nozzle.

Among the other objectionable features of the prior art valves is the imbalance of the tubular sliding valve member, particularly at high rates of flow, even though the area of the upstream and downstream ends of the sliding valve member on which the fluid pressure acts are equal. The imbalance tends to close a valve at high rates of flow and endangers the life of a firefighter by reducing or cutting off flow of water in the event the valve should slam shut.

The prior art flow control mechanism for reciprocably moving the tubular sliding valve member also does not provide means which permit positioning the valve to effect a preselected specific rate of flow between the fully open or fully closed position of adjustment and maintaining the selected position under all conditions.

OBJECTS OF THE INVENTION

It is an object of the invention to provide a valve assembly in which there is a substantially linear relationship between the rate of flow of fluid through the valve and the movement of the valve operating mechanism.

Still another object of the invention is to provide a valve assembly having a tubular sliding valve member which resists a tendency to close at high rates of flow therethrough.

It is also an object of the present invention to provide valve control and positioning mechanism which is more wear resistant and adapted to conveniently maintain the valve in one or more preselected positions between fully open and fully closed positions.

It is a further object of the present invention to provide an improved valve assembly which overcomes the disadvantages of the prior art valves which will be apparent to those skilled in the art.

Other objects of the invention will be apparent to one skilled in the art from the following detailed description and claims when read with the accompanying drawing wherein:

DRAWING FIGURES

SUMMARY OF THE INVENTION

Figure 2:
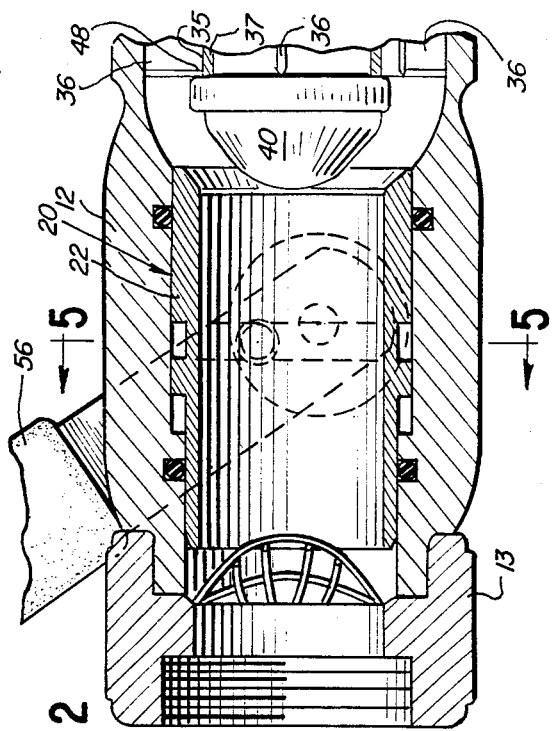
FIG. 2 is a fragmentary vertical sectional view partially in elevation of the fire hose nozzle and valve assembly of FIG. 1 with the valve in open position.

The above mentioned objects can be obtained and a substantially linear relationship established between the rate of flow and the movement of the valve flow control member can be achieved in an annular flow type sliding valve assembly by providing a contoured valve seat having compound surfaces mounted in a fixed position axially within a valve housing in axial alignment with the sliding valve member. Whereas the prior art valve seats used in the annular flow type sliding valve assemblies of the instant type had a conical form, the improved contoured surface of the valve seat in the present invention is a surface of revolution about the central axis of the valve seat aerodynamically shaped so that movement of the valve operating member produces an incremental change in the rate of flow which is uniform and proportional to the incremental displacement of the valve control member.

The contour of the valve seat which produces the desired proportional increase in flow in a valve assembly such as in a fire hose nozzle or fire pump truck valve, consists of a combination of multiple radius and linear segments. The contour of the valve seat is such that when the tubular sliding valve member is moved away from its seating engagement or closed position, the area of the annular orifice or flow passage increases gradually with the axial movement of the sliding valve member in order to provide good control of the rate of flow through the valve assembly while the differential pressure across the valve is large. As the tubular valve member is moved a greater distance from the fully closed position and as the pressure drops across the valve becomes smaller, the contour of the valve seat at points spaced a greater distance from the base of the valve seat is such that the area of the annular orifice or flow passage becomes larger at an increasing rate. Thus, the increase in the flow through the valve remains proportional to the movement of the valve control mechanism even though the differential pressure across the valve decreases rapidly as the annular orifice becomes larger. The contour of the valve seat permits unrestricted flow when the sliding valve member is in extreme open position.

The tubular sliding valve member which engages the valve seat in one extreme reciprocable position of adjustment (i.e. in the closed position) has also been improved so that it is now a substantially balanced sliding valve member and resists the tendency to close at high rates of flow. The improved balance is achieved by enlarging the area of the downstream end surface of the sliding valve member relative to the area of the upstream end surface sufficiently to offset the frictional drag of the fluid flowing through the tubular valve member and the differential velocity effect on the ends of the tubular valve member during use, particularly at the high velocities of fluid flow through the valve which are encountered in a fire hose nozzle. The fluid acting upon the larger downstream end surface of the sliding valve member urging the valve member toward open position tends to counteract the frictional effect of drag exerted by the fluid passing over the inner surface of the tubular valve member.

The tubular valve member is also adapted for rotational movement within the valve housing in addition to reciprocable axial movement in order to prevent uneven wear of the surface thereof which is contacted by the valve actuating means. The tubular valve member has a circumferential groove formed in the outer surface which receives a lug adapted to be moved eccentrically by the valve actuating means. The tubular valve member has a net incremental rotational movement imparted to it by each reciprocable axial movement thereof such that wear of the circumferential groove is evenly distributed so that the lug remains in tight engagement within the groove.

An improved valve actuating means is provided for reciprocably and rotatably moving the tubular valve member and comprises a disc member rotatably mounted in a mating bore in the valve body concentrically with the pivot for the reciprocable valve actuating means, such as a bail type handle. A lug extends through the lower end of each arm of the bail type handle and through the disc member at a point spaced radially from the central pivot point of the disc member and into the circumferential groove formed in the outer surface of the tubular valve member so that when the bail type handle is moved reciprocably, the valve member is moved reciprocably within the valve housing.

The valve actuating means is also provided with positioning means which permit multiple and repeated positioning of the valve to a selected setting between fully opened and closed positions such that in a fire hose nozzle it is possible to adjust immediately to a desired rate of flow which past experience or testing has shown to be most appropriate for a particular set of conditions. In the preferred embodiment the positioning means comprises spaced recesses formed along an arcuate path in a lateral surface of the valve housing, and a spring detent means or the like is mounted on and extends inwardly from the inner surface of an arm of the bail type handle opposite the recesses formed in the lateral surface of the housing.

DETAILED DESCRIPTION

Figure 1:
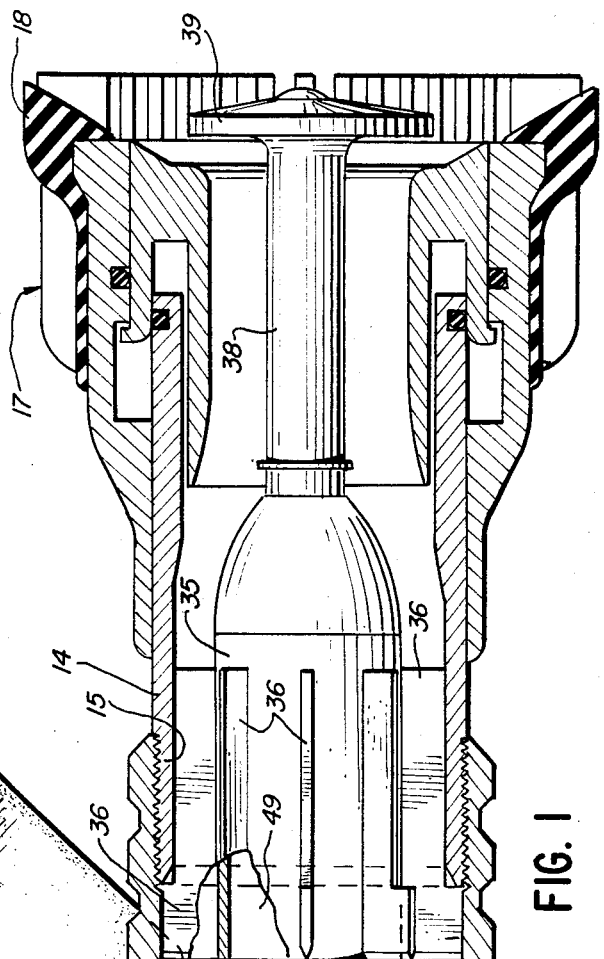
FIG. 1 is a vertical sectional view partially in elevation of a preferred embodiment showing a fire hose nozzle and valve assembly embodying the present invention with the valve in closed position.
Figure 4:
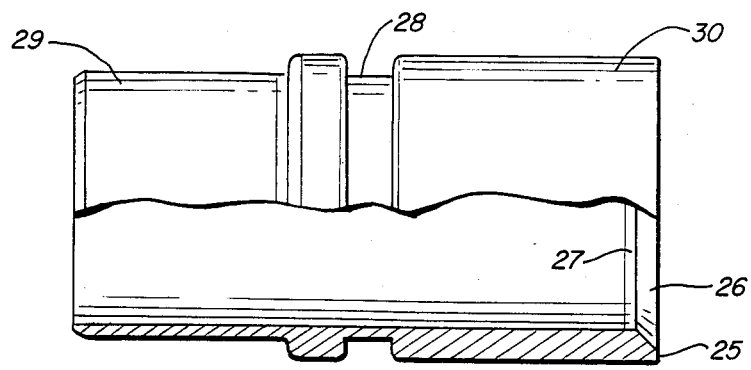
FIG. 4 is a vertical sectional view partially in elevation of the tubular sliding valve member of FIGS. 1 and 2.

Referring particularly to FIGS. 1 and 2 of the drawing a fire hose nozzle assembly 10 embodying the features of the present invention is shown to illustrate a preferred embodiment of the invention. The nozzle assembly 10 in FIGS. 1 and 2 comprises a receiver section 12 and a body section 14 disposed in axial alignment with the receiver section 12 preferably threadably connected as at 15 to facilitate cleaning and repair of the valve. A coupler section 13 is mounted on the upstream end of the receiver section 12 to permit the nozzle to be readily connected to a source of fire extinguishing fluid under pressure. A flow control valve assembly 20 is enclosed within the receiver section 12 and tubular body section 14 in the waterway through the valve assembly. The flow control valve assembly 20 includes a tubular sliding valve member or slider 22 which is reciprocably and rotatably mounted in the receiver section 12 and which is provided with suitable fluid seals 23, 24 for engagement with the tubular valve member 22.

The tubular valve member 22 is adapted to form a sealing engagement with a valve seat 40 in one extreme position of axial movement. The valve seat 40 is supported in the upstream end of the body section 14 and extends into the downstream end of the receiver section 12. A nozzle assembly 17 is mounted on the downstream end of the body section 14 with a flow-shaping sleeve 18 supported on the downstream end of the assembly 17 for axial movement thereon.

Figure 3:
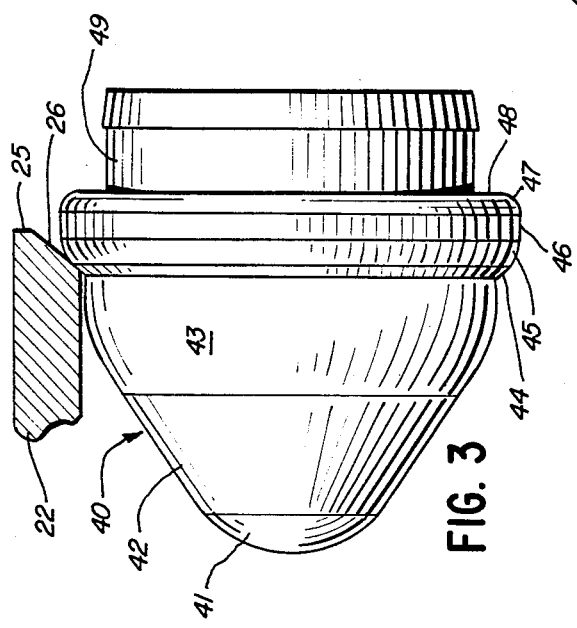
FIG. 3 is an enlarged side elevational view partially in vertical section of the valve seat of FIGS. 1 and 2.

The valve seat 40, as best shown in FIGS. 1–3, is preferably formed of a deformable resilient and highly abrasion resistant material impervious to moisture and impact resistant, such as polyethylene, and is supported in the tubular body section 14 by means of a generally cylindrical member 35 in axial alignment with the tubular valve member 22. The cylindrical member 35 has an outer diameter substantially smaller than the inner diameter of the valve body section 14 and has a plurality of radially extending spacer and flow straightening vanes 36 which contact the inner surface of the body section 14. The upstream end 37 of the cylindrical section 35 engages a shoulder 48 formed on the valve seat 40 to fixedly position the valve seat 40 in axial alignment with the tubular sliding valve member 22.

The downstream end of the cylindrical member 35 supports a post 38 which extends axially downstream and has a transverse baffle member 39 mounted at the downstream end thereof. The transverse baffle 39 is adapted to coact with the nozzle assembly 17.

The contour of the valve seat 40 is defined by a surface of revolution about a longitudinal axis by multiple interconnected linear and curved lines having different radii. While there are many possible contours which could be used to provide proportional flow for a particular valve assembly under pressure conditions, a preferred embodiment as described from the upstream end toward the downstream end thereof consists of a blunt flattened transverse end surface 41, the base of which defines the upper surface of a truncated conical section 42 connecting with a first spherical section 43 followed by a second spherical section 44 having a larger convex radius than the radius of the first spherical section such that there is an outwardly flare in the coutour of the valve seat 40 with which the tapered or bevel end 26 of the tubular valve section 22 is adapted to sealably engage when the valve assembly is in closed position. The second spherical section 44 is provided with a radius of curvature such that the bevelled inner surface 26 at the downstream end of the tubular valve member or slider 22 and the outer surface of the spherical section 44 are tangent when the valve assembly is in closed position in order to insure forming a sealing engagement in the event of minor misalignments in the valve assembly.

Below the second spherical section 44 of the valve seat 40 is an enlarged section formed by a convex radius section 45 followed by a cylindrical section 46 and another convex radius section 47 and a transverse section 48 which forms an abutment surface for engaging the upstream end 37 of the cylindrical section 35. The enlarged section formed by segments 45, 46, and 47 form an aerodynamic section to allow the fluid to flow through the valve asembly substantially unimpeded into the downstream section of the valve assembly when the valve is in open position. A reduced diameter cylindrical section 49 extends axially downstream from the transverse surface 48 and is adapted to form a secure frictional engagement in the upstream end of the cylindrical section 35.

The contour of the valve seat provided by the first spherical section 43 functions so as to restrict the flow of fluid through the valve during the initial opening of the valve assembly and provides a further advantage in that the spherical section 43 tends to deflect and shield the valve seating surface formed by the second spherical section 44 from abrasion from debris entrained in the fluid flowing through the valve. In this manner, the useful life of the valve is extended.

In a valve assembly having a tubular sliding valve member with an inner diameter of 1.5 inches and the downstream end surface thereof provided with a 45° bevelled surface 26 and an outside diameter of about 1.8 inches, it has been found useful to provide a valve seat 40 wherein the end surface 41 forming the upper end of the frustroconical section 42 has a diameter of about 0.6 inches with the frustro-conical section 42 having a diameter of about 1.1 inches at the base, a first spherical section with a radius of about 0.7 inches, a height of about 0.2 inches and a diameter at the base being about 1.5 inches; a second spherical section 44 having a radius of about 1.1 inches, a height of about 0.05 inches, and a diameter at the base being about 1.6 inches.

The tubular sliding valve member 22 is preferably formed of a tubular section of stainless steel with a uniform internal diameter having an upstream section 29 with uniformly thick walls and a downstream enlarged section 30 having an outer diameter substantially larger than the outer diameter of the upstream section 29. The downstream end of the enlarged section 30 preferably has a flat end surface 25 and a bevelled section 26 extending inwardly from the inner edge of a flat end surface 25. A small chamfer 27 is preferably formed at the upper edge of the bevelled surface 26 concentric with the bevelled section 26. The bevelled section 26 is adapted to form a sealing engagement with a valve seat 40 when the valve is in closed position.

In a tubular valve member 22 having a internal diameter of about 1.5 inches and an outer diameter at the upstream end of about 1.7 inches, it has been found desirable in order to provide a substantially balanced valve member to provide the downstream end of section 30 with an outer diameter of about 1.9 inches. The enlarged diameter of the downstream end of the tubular valve member 22 provides a greater surface area at the downstream end relative to the upstream end on which the fluid in the valve works to counteract the frictional drag of the fluid flowing through the tubular valve member and the differential velocity effect on the ends of the tubular valve member as the fluid flows throughout the tubular valve member 22 and thereby provides a substantially balanced valve, particularly at high rates of flow, and avoids the valve member unexpectedly moving into closed position.

The valve actuating means which reciprocably and rotatably move the tubular valve member 22 into and out of the valve seat 40 comprises a pair of cylindrical discs 50, 50', each mounted in a mating bore 75, 75', extending through the opposite lateral walls 60, 60', respectively, of the receiver section 12. Each cylindrical disc 50, 50' is mounted in the receiver section 12 for rotational movement about a trunnion 54, 54', respectively, which extends through the lower ends of the arms 55, 55' of a bail type handle 56. A lug 57 extends through the ends of the arm 55 and the cylindrical disc 50 at a point spaced radially from the trunnion 54 so that reciprocal movement of the handle 56 effects eccentric movement of the lug 57. The inner end of the lug 57 is provided with a reduced diameter end section 58 which is adapted to seat in the circumferential groove 28 formed in the outer surface of the tubular valve member 22. When the handle 56 is moved in one reciprocal direction (i.e. opened), the eccentric movement of the lug 57 causes the valve member 22 to be rotated, because of the difference in the radius of the eccentric lug outer portion must travel a greater distance than its inner portion for a given rotational displacement of the disc 50. When the handle 56 is moved in the opposite reciprocal direction toward closed position, the tubular valve member 22 is rotated in the opposite direction, but through a greater angle. Thus, the net result is a small net rotation of the valve member 22 for every opening and closing of the valve member. Because of this rotational movement, the wear on the circumferential groove 28 is evenly distributed.

Each cylindrical disc 50, 50' is retained in its respective bore within the receiver section 12 by means of a circular spring ring 70 (or race of balls) engaging an external groove 71 formed in the outer lateral surface of the disc 50 with the ring 70 seating in a similar internal groove 72 formed in the bore 75. The disc 50 is adapted to be rotatably moved but restrained against lateral movement and misalignment in the bore 75.

Figure 5:
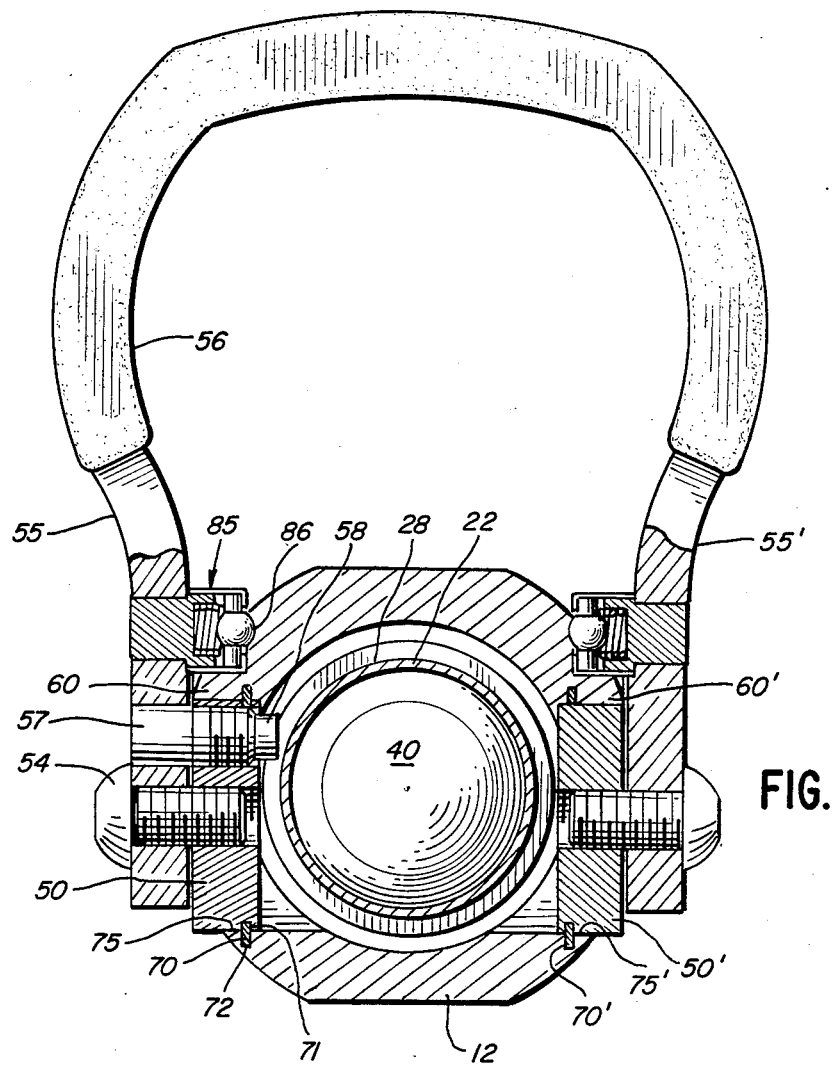
FIG. 5 is a vertical sectional view partially in elevation taken along the line 5—5 of FIG. 2.
Figure 6:
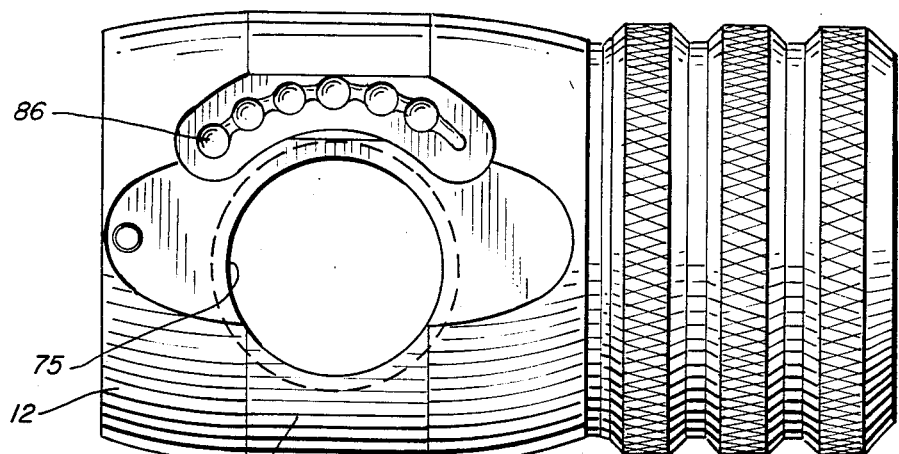
FIG. 6 is a fragmentary side elevational view of the fire hose nozzle and valve assembly of FIG. 1.

A valve actuating means which permits multiple and repeated positioning of the valve operating means to a selected setting between fully opened and closed positions is shown in FIGS. 5 and 6 and preferably comprises a series of spaced recesses 86 formed in the lateral wall of the receiving section 12 and a spring detent means 85 mounted adjacent the lower end of the arms of the bail type handle opposite the said recesses 86, thereby facilitating the positioning of the handle means at any pre-selected detent positions between fully opened and closed positions of the handle.

Figure 7:
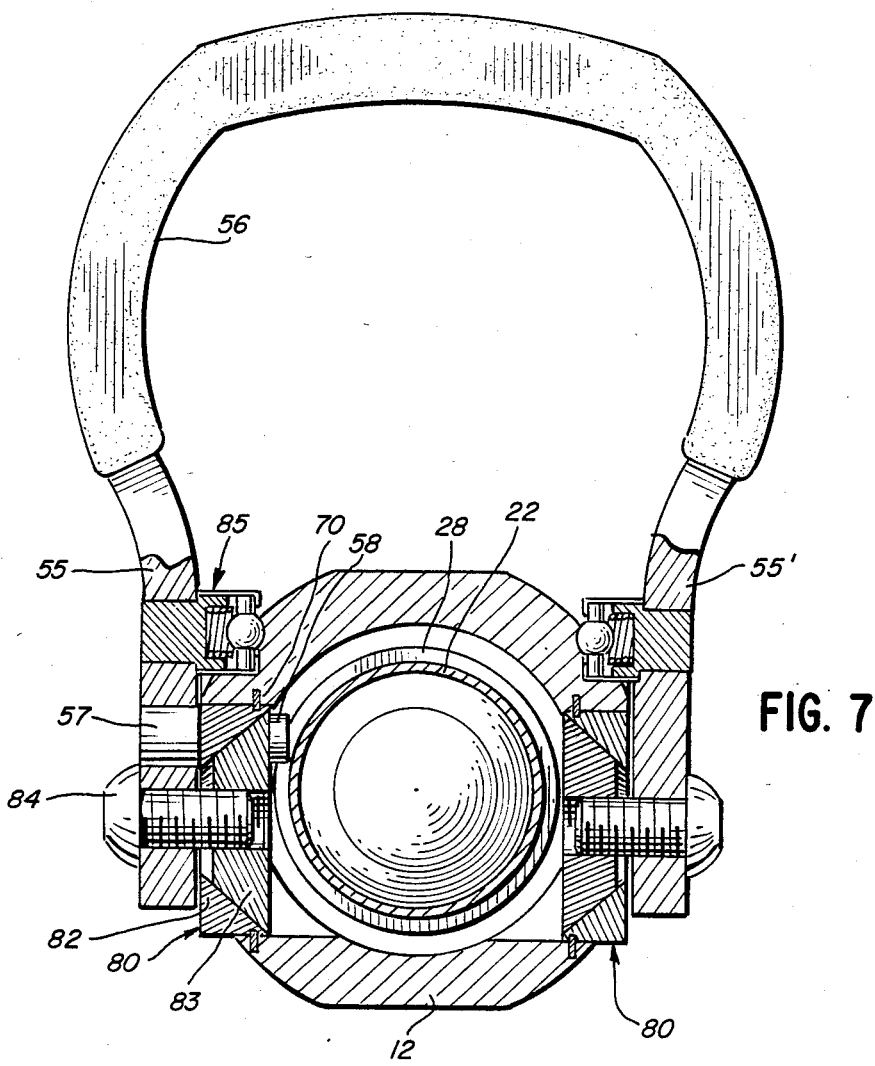
FIG. 7 is a vertical sectional view partially in side elevation showing a valve braking means in the valve assembly of FIG. 1.

Each of the discs 50, 50' of FIG. 5 can be replaced by the modified discs 80, 80' shown in FIG. 7 which are adapted to provide additional drag or braking action for resisting movement of the handle 65 and the tubular valve member 22 in either reciprocable direction. Each improved disc 80, 80' comprises a two-part assembly with an outer disc member 82 formed of a material, such as polyethylene, which is resilient and highly resistant to abrasion, has good impact resistance, and is impervious to moisture. The disc member 82 has a frustro-conical recess in its inner lateral surface concentrically disposed with the circumference thereof. A frustro-conical insert member 83 formed of a rigid material, such as aluminum, and preferably having four arm-like sections extending radially from the axis thereof. The insert 83 is adapted to exert pressure on the inner surface of disc 82, as by means of a screw member-trunnion 84 being threadably mounted therein to effect expanding the disc 82 and force the periphery of the disc 82 into a frictional engagement with the bore 75 in the receiver section 12.

I claim:

1. In a flow-control valve assembly comprising a valve body, an axially slidable tubular valve member disposed axially within said valve body and having a bevelled surface at the downstream end thereof, a valve seat member restrained against axial movement disposed in said valve body and in axial alignment with said tubular valve member, and means for effecting reciprocable movement of said tubular valve member into a position of sealing engagement with said valve seat and movement away from said sealing engagement to permit flow of fluid past said valve seat member, the improvement comprising: a valve seat having a contoured configuration defined by a surface of revolution about a central axis of a combination of linear and curved lines having different radii which provides a relatively blunt upstream end, a generally frustro-conical section extending downstream of said upstream end, a first spherical section forming a restricted flow passage downstream of said conical section, a second spherical section extending downstream of said first spherical section and having a radius of curvature greater than said first spherical section extending outwardly from said first spherical section and adapted to form a sealing engagement with said bevelled surface when said tubular valve member is moved axially into engagement therewith; whereby flow of fluid is increased proportional to the movement of the valve actuating means away from said sealing engagement while the differential pressure across the valve asembly is large and remains proportional to the movement of the valve actuating means further from said sealing engagement as the differential pressure across the valve decreases.

2. A valve assembly as in claim 1, wherein said tubular valve member having upstream and downstream ends is provided with an enlarged diameter downstream section having the cross sectional surface area of the downstream end thereof substantially larger than the cross sectional surface area of the upstream end of the tubular valve member in order to compensate for the effect of both the frictional drag of fluid flowing through said tubular valve member and the differential velocity effect on the ends of the tubular valve member; thereby reducing the tendency of the tubular valve member to close at high rates of flow of fluid through said valve assembly.

3. A valve assembly as in claim 1, wherein said means for effecting reciprocable movement of said valve member comprises a circumferential groove formed in the outer surface of said tubular valve member, a disc mounted axially on a pivot member in a bore in a lateral surface of said valve body adapted for rotatable movement about said pivot member, a lug extending through said disc at a point spaced radially from said pivot member into said circumferential groove, and an operating means connected with said lug for moving said disc in limited reciprocable rotatable motion to effect reciprocable movement of said tubular valve member into and out of seating engagement with said valve seat.

4. A valve assembly as in claim 3, wherein said operating means comprises a handle pivotally mounted on said pivot member; whereby reciprocable movement of said handle effects reciprocable movement of said tubular valve member.

5. A valve assembly as in claim 3, wherein said disc is comprised of a disc section formed of a resilient deformable abrasion resistant material having a frustro conical recess formed centrally therein, a rigid insert member having a frustro conical cross sectional configuration along a diameter thereof adapted to be seated in said recess in said disc member, and means for exerting axial pressure on said insert member sufficient to effect expansion of circumferential portions of said disc member; whereby said disc section is brought into frictional engagement in said bore to exert a braking action on the movement of said tubular valve member.

6. A valve assembly as in claim 1, wherein said means for effecting movement of said tubular valve member comprises a reciprocable handle mounted for pivotal movement on a support member in said valve body, a spring detent means mounted on said handle member at a point spaced from said support member, and a plurality of spaced recesses formed in a surface of said valve body disposed opposite said detent means engageable therewith.

7. In a flow-control valve assembly comprising a valve body, an axially slidable tubular valve member with upstream and downstream end surfaces disposed axially within said valve body and having a bevelled surface at the downstream end thereof, a valve seat member restrained against axial movement disposed in said valve body and in axial alignment with said tubular valve member, and means for effecting reciprocable movement of said tubular valve member into a position of sealing engagement with said valve seat and movement away from said sealing engagement to permit flow of fluid past said valve seat member, the improvement comprising: the said tubular valve member provided with an enlarged downstream end having the area of the downstream end surface substantially larger than the area of the upstream end surface of the tubular valve member in order to compensate for the effect of both the frictional drag of fluid flowing through said tubular valve member and the differential velocity effect on the upstream and downstream ends of the tubular valve member; thereby reducing the tendency of the tubular valve member to close at high rates of flow of fluid through said valve body.

8. In a flow-control valve assembly comprising a valve body, an axially slidable tubular valve member disposed axially within said valve body, a valve seat restrained against axial movement disposed in said valve body in axial alignment with said tubular valve member, and means for effecting reciprocable movement of said tubular valve member into a position of sealing enagagement with said valve seat and movement away from said sealing engagement to permit flow of fluid past said valve seat, the improvement comprising: valve operating means for effecting reciprocable movement of said tubular valve member having a circumferential groove formed in the outer surface of said tubular valve member, a circular disc mounted in a bore in a lateral surface of said valve body adapted for limited reciprocable rotatable moveable about an axial pivot member on said valve body, a lug extending from the inner surface of said disc through said valve body into operative engagement in said groove of said tubular valve member, reciprocable means for moving said disc in limited reciprocable rotatable motion for effecting reciprocable movement of said tubular valve member into and out of seating engagement with said valve seat, said disc comprised of an outer resilient deformable abrasion resistant disc member having a frustroconical recess formed centrally therein, a rigid insert member having a frustroconical cross sectional configuration along a diameter thereof seated in said recess, and means for exerting axial pressure on said insert member sufficient to effect expansion of circumferential portions of said disc member; whereby movement of said reciprocable moving means is restricted and a braking action exerted on the movement of said tubular valve member when said insert member is pressed into frictional engagement with said disc member.

9. A flow control valve assembly comprising a valve body, flow control means in said valve body comprising a valve member and a valve seat axially aligned in said valve body with only one of said valve member and valve seat being reciprocably movable axially relative to the other into and out of sealing engagement to control the flow of fluid through said valve body, operating means for effecting relative axial movement between said valve member and valve seat into and out of sealing engagement, said operating means comprising a cylindrical disc mounted in a bore in a lateral surface of said valve body adapted for reciprocable rotary movement about an axial pivot member on said valve body, means for moving said disc in limited recriprocable rotary motion, said disc having a disc member formed of a resilient deformable abrasion-resistant material with a frustroconical recess formed centrally therein, a rigid insert member having a frustroconical cross section configuration along a diameter thereof seated in said recess, and adjusting means for exerting axial pressure on said insert member sufficient to effect expansion of outer cylindrical portions of said disc member; whereby movement of said operating means is restricted when said disc member is pressed into frictional engagement in said bore to exert a braking action on the relative axial movement of said valve member and valve seat.

10. A flow control valve assembly as in claim 9, wherein said valve member is a tubular valve member which is reciprocable movable axially into and out of sealing engagement with said valve seat fixedly mounted in said valve body.

11. A flow control valve assembly as in claim 10, wherein said reciprocable moving means comprises a bail-type handle operatively connected with said disc.

* * * * *